(12) United States Patent
Eckhardt et al.

(10) Patent No.: US 7,627,747 B2
(45) Date of Patent: Dec. 1, 2009

(54) HARDWARE/SOFTWARE PARTITIONING FOR ENCRYPTED WLAN COMMUNICATIONS

(75) Inventors: Uwe Eckhardt, Dresden (DE); Matthias Baer, Hohenstein-Ernstthal (DE); Ralf Flemming, Dresden (DE); Steffen Hofmann, Chemnitz (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 649 days.

(21) Appl. No.: 10/816,687

(22) Filed: Apr. 2, 2004

(65) Prior Publication Data

US 2005/0172119 A1 Aug. 4, 2005

(30) Foreign Application Priority Data

Jan. 30, 2004 (DE) ........................ 10 2004 004 799

(51) Int. Cl.
*H04L 29/06* (2006.01)
*G06F 21/00* (2006.01)
(52) U.S. Cl. ........................................ 713/153; 726/14
(58) Field of Classification Search ................ 713/153; 726/14
See application file for complete search history.

(56) References Cited

U.S. PATENT DOCUMENTS

| | | | | |
|---|---|---|---|---|
| 2001/0055283 | A1* | 12/2001 | Beach | 370/328 |
| 2004/0059825 | A1* | 3/2004 | Edwards et al. | 709/230 |
| 2004/0146158 | A1* | 7/2004 | Park | 380/37 |

FOREIGN PATENT DOCUMENTS

WO 03067453 8/2003

OTHER PUBLICATIONS

Jonathan G. Campbell, Algorithms and Data Structures—CSC 721, Nov. 2000. School of Computer Science, Queens University Belfast. Chapter 13.*
Pablo Brenner, A Technical Tutorial on the IEEE 802.11 Protocol, Copyright 1997, BreezeCOM Wireless Communications. p. 16-22.*
Information Technology—Telecommmunication and information exchange between systems—Local and metropolitan area networks—Specific Requirements—Part 11: Wireless LAN Medium Access Control (MAC) and Physical Layer (PHY) specifications. 1999. ANSI/IEEE Std. 802.11 1st ed. p. 18-21, 34-51, and 59-65.*
Cox, Philip. Robust Security Network: The future of wireless security. 2003. System Experts Corporation. http://www.systemexperts.com/win2k/SecureWorldExpo-RSN.ppt.*
Translation of Official Communication for German Application No: 10 2004 004 799.5-31; issued Jul. 14, 2008; Entitled: "Hardware/Software-Paritionierung Fuer Verschluesselte WLAN-Verbindungen".

* cited by examiner

*Primary Examiner*—Gilberto Barron, Jr.
(74) *Attorney, Agent, or Firm*—Meyertons, Hood, Kivlin, Kowert & Goetzel, P.C.

(57) ABSTRACT

A method of performing encrypted WLAN communication is provided that comprises the steps of performing a connection set-up for the encrypted WLAN communication and performing data frame encapsulation and/or decapsulation during the encrypted WLAN communication. The connection set-up is performed by executing software-implemented instructions, and the data frame encapsulation and/or decapsulation is performed by operating single-purpose hardware. In embodiments, corresponding single-purpose hardware devices, integrated circuit chips, computer program products and computer systems are provided. The embodiments may provide an improved hardware/software architecture for 802.11i security enhancement.

68 Claims, 9 Drawing Sheets

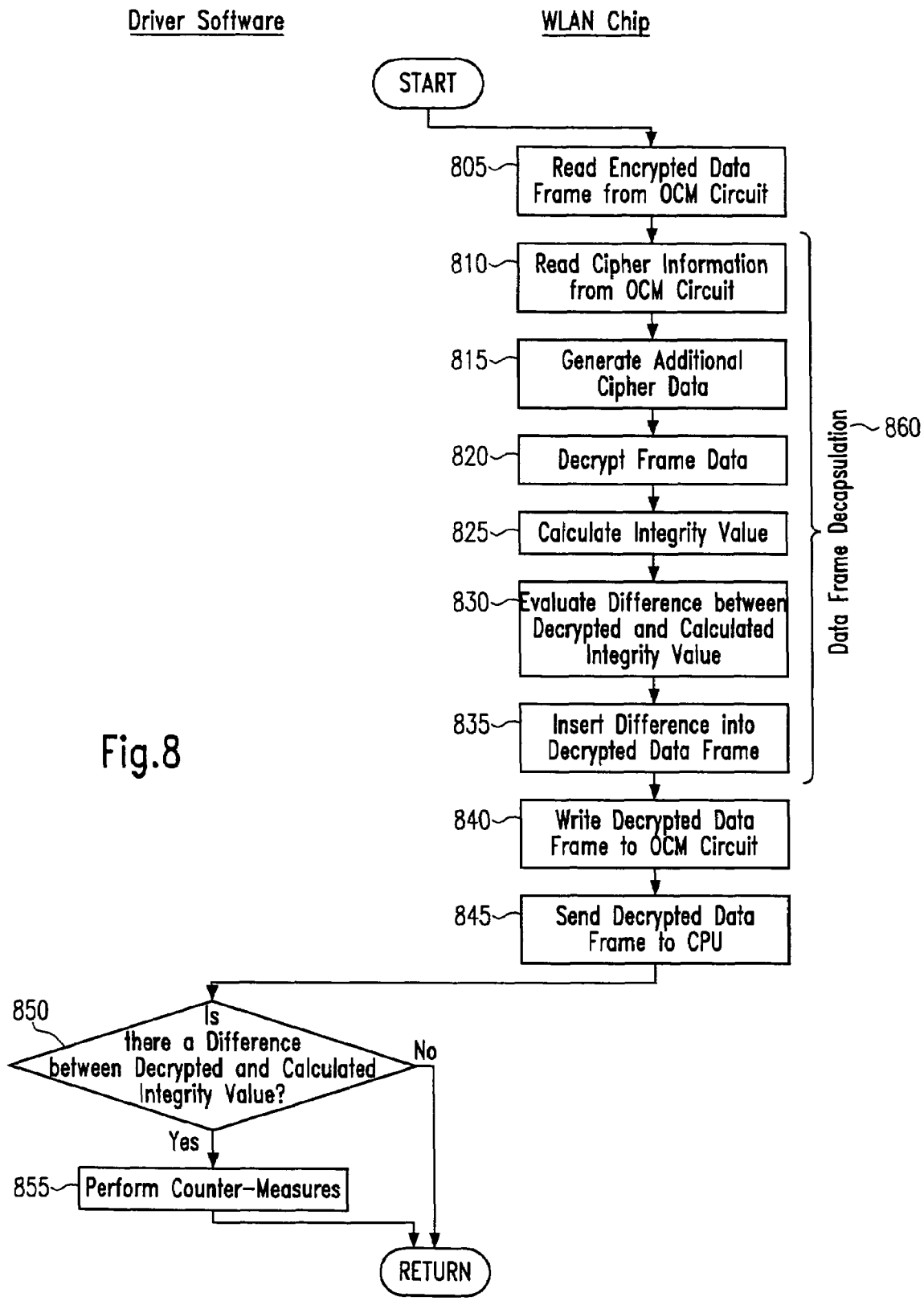

HARDWARE/SOFTWARE PARTITIONING FOR ENCRYPTED WLAN COMMUNICATIONS

BACKGROUND OF THE INVENTION

1. Field of the Invention

The present application relates to encrypted WLAN (Wireless Local Area Network) communication methods and corresponding devices, integrated circuit chips, computer program products and computer systems, and in particular to the hardware/software implementations thereof.

2. Description of the Related Art

A wireless local area network is a flexible data communication system implemented as an extension to or as an alternative for a wired LAN. Using radio frequency or infrared technology, WLAN systems transmit and receive data over the air, minimizing the need for wired connections. Thus, WLAN systems combine data connectivity with user mobility.

Today, most WLAN systems use spread spectrum technology, a wide band radio frequency technique developed for use in reliable and secure communication systems. The spread spectrum technology is designed to trade off bandwidth efficiency for reliability, integrity and security. Two types of spread spectrum radio systems are frequently used: frequency hopping and direct sequence systems.

The standard defining and governing wireless local area networks that operate in the 2.4 GHz spectrum is the IEEE 802.11 standard. To allow higher data rate transmissions, the standard was extended to 802.11b, which allows data rates of 5.5 and 11 Mbps in the 2.4 GHz spectrum. Further extensions exist.

In order to address existing security gaps of the 802.11 standard's native security, i.e. the WEP (Wired Equivalent Privacy) protocol, the 802.11i security standard was developed. This enhanced security standard relies on the 802.1x standard for port-based access control, and the TKIP (Temporal Key Integrity Protocol) and CCMP (Counter-mode Cipher block chaining Message authentication code Protocol) protocols for data frame encapsulation and decapsulation. 802.1x provides a framework for WLAN station authentication and cryptographic key distribution, both features originally missing from the 802.11 standard. The TKIP and CCMP protocols are cipher protocols providing enhanced communication security over the original WEP protocol, the TKIP protocol being targeted at legacy equipment, and the CCMP protocol being targeted at future WLAN equipment.

According to both cipher protocols, there is generated an individual character string for each data frame used for encrypting the data frame. This encryption character string is based on a packet number or sequence number inserted in the data frame indicating data frame ordering. Out of order data frames are discarded. Further, the encryption character string depends on the MAC (Medium Access Control) addresses of the communicating WLAN counterparts, e.g., a WLAN station and a WLAN access point. At the transmitting WLAN counterpart, an integrity value is calculated from the original plaintext frame data and is inserted into the data frame during encapsulation in order to allow the receiving WLAN counterpart to verify whether the decapsulated frame data are identical to the original plaintext frame data. According to the TKIP and CCMP protocols, this integrity value is not only a simple CRC (Cyclic Redundancy Check) checksum, but is generated using a cryptographic MIC (Message Integrity Code) calculation.

Referring now to FIG. 1A, which illustrates an encapsulation process according to the TKIP protocol, there is generated a data frame specific key 118 from a temporal key 102, the transmitter address 104, and the sequence number 106. The data frame specific key 118 is split into a data frame specific initialization vector (IV) 122 and a general, data frame independent RC4 (Rivest's Cipher 4) key 120. Both the IV 122 and the RC4 key 120 are fed into the RC4 encapsulation process 132 to encapsulate an input plaintext data frame 130. The input plaintext data frame 130 may be generated by fragmentation 128 of a precedent unfragmented plaintext data frame 126. The plaintext data frame 126 contains an integrity value calculated by MIC calculation 124 from the source address 110, destination address 112, and original plaintext data frame 114 using a MIC key 108 and the sequence number 106.

FIG. 1B depicts the RC4 encapsulation process 132, which is performed according to the WEP protocol of the original 802.11 standard. The initialization vector 122 and RC4 key 120 are concatenated in 136 and then input to the RC4 pseudo random key generation 138. The plaintext data frame 130 is used to calculate a CRC checksum in 140 and is then concatenated with the CRC checksum in 142. The encrypted data 146 are generated by bitwise XOR-(exclusive or) gating 144 the concatenated plaintext data frame and CRC checksum resulting from the concatenation 142 with the RC4 pseudo random key generated in 138. The result of the RC4 encryption process 132 is an encrypted data frame 134 containing the initialization vector 122 and the encrypted data 146.

Turning now to FIG. 2A, which illustrates an encapsulation process according to the CCMP protocol, there is constructed Additional Authentication Data (AAD) 212 in 210 using the MAC addresses contained in the frame header 208 of the plaintext data frame 202. An initialization vector 216 is constructed in 214 from the Packet Number (PN) 218 contained in the plaintext data frame 202 and data from the frame header 208. The frame header 208, the additional authentication data 212, the initialization vector 216, the packet number 218, and the plaintext data 220 contained in the plaintext data frame 202 are fed into the CCMP encryption process 224 together with an AES (Advanced Encryption Standard) key 204. The encrypted data frame 226 resulting from the CCMP encryption 224 is concatenated in 230 with a CCMP header, constructed in 222 from the packet number 218 and an AES key ID 206 in order to generate the final encrypted data frame 232.

The CCMP encryption 224 is depicted in FIG. 2B. The data encryption 252 and MIC calculation 254 are performed in parallel. Both the data encryption 252 and the MIC calculation 254 comprise AES encryption 234. To each AES encryption 234 the AES key 204 is input. For clarity reasons, the AES key 204 is not depicted in FIG. 2B. During the data encryption 252, the plaintext data 220 contained in the input plaintext data frame 202 are encrypted blockwise by bitwise XOR-gating 236 data blocks 256 of 128 bits size with the result of AES encrypting 234 a counter preload (PL) 240, 242, 244, 246. Each counter preload depends on the additional authentication data 212, not depicted for clarity reasons, and a consecutive counter value.

The MIC calculation 254 is seeded with the initialization vector 216. The initialization vector 216 is fed into an AES encryption 234 and its output is bitwise XOR-gated 236 with select elements from the frame header 208 and is then again fed into an AES encryption 234. This process continues over the remainder of the frame header 208 and down the length of the plaintext data 220 to compute a final CBC-MAC (Cipher-Block Chaining Message Authentication Code) value of, e.g., 128 bits size. The upper part, e.g., 64 bits of the CBC-MAC are extracted and used in the final MIC. The resulting encrypted data frame 226 includes the plaintext frame header 208 and packet number 218, the encrypted data 258 and the encrypted MIC 250.

FIG. 2C illustrates a regular encryption round of the AES encryption process 234, which is a sequence of four encryption steps. A block 252 of input plaintext data is written into a matrix comprising four lines and a variable number of rows depending on the block size. Each matrix element $a_{i,j}$ corresponds to one byte of the input plaintext data block 252, wherein i=0, ... 3 denotes the line and j=0 ... n denotes the row. In the example depicted in FIG. 2C, n=3. In the first encryption step, byte substitution 254, each byte $a_{i,j}$ is substituted with another byte $s_{i,j}$ according to substitution rules implemented in a cryptographic substitution box. In the shift row step 256, the elements in each matrix line are cyclically permutated. The mix column step 258 comprises row-wise multiplying the matrix elements with a constant and then XOR-gating the matrix elements with each other. Finally, in the key addition step 260, the results of the mix column step 258 are XOR-gated with an AES round key 264, which has been calculated from the AES key 204. The regular round of the AES encryption 234 is repeated several times by re-entering the encrypted data 262 to the byte substitution step 254. In addition to the regular rounds, the AES encryption 234 comprises an initial key expansion round for generating the AES round key 264 from the AES key 204, and a final round with the mix column step 258 omitted.

To implement the above described communication security techniques or similar approaches known in the art, existing encrypted WLAN communication methods are performed by both executing software-implemented instructions and operating hardware devices that are capable of executing specific functions they are designed for. This may lead to a number of disadvantages.

Referring now to FIG. 3, the steps of communication security are performed by executing software-implemented instructions of a connection set-up function 330 and of an encapsulation/decapsulation function 340 of driver software 310 running, e.g., on a host CPU, and operating a connection set-up circuit 350 and an encapsulation/decapsulation circuit 360 on a WLAN chip 320. Thus, prior art WLAN chips usually suffer from high hardware complexity and costs.

Further, conventional WLAN communication systems often have the disadvantage of producing multiple inter-component data transfer. The steps of executing software-implemented instructions and operating the WLAN chip components 350 and 360 are performed alternately. Thus, the prior art techniques often lead to an intense data traffic between the driver software 310 and the WLAN chip 320, which requires large traffic capacities and bandwidth, and which may also be a severe reason for data faults.

In addition, there is often a security problem in the prior art systems since the data traffic comprises the exchange of intermediate data 390 intended for or resulting from intermediate substeps of the connection set-up or of the data frame encapsulation or decapsulation. The intermediate data 390 may include, e.g., the data frame specific key 118, the additional authentication data 212 or the initialization vector 216. Since the intermediate data 390 may include information on security secrets, e.g., on applied cryptographic keys, their exchange may produce a considerable security gap.

Moreover, conventional systems may suffer from latencies which may occur in the interface connecting the driver software 310 running on the host CPU with the WLAN chip 320. Such latencies usually result in unnecessary deceleration of the communication security and may therefore lead to further problems in achieving efficient transmission data rates.

SUMMARY OF THE INVENTION

An improved encrypted WLAN communication method and corresponding hardware device, integrated circuit chip, computer program product, and computer system are provided that may overcome the disadvantages of the conventional approaches.

In one embodiment, a method of performing encrypted WLAN communication is provided that comprises the steps of performing a connection set-up for the encrypted WLAN communication and performing data frame encapsulation and/or decapsulation during the encrypted WLAN communication. The connection set-up is performed by executing software-implemented instructions, and the data frame encapsulation and/or decapsulation is performed by operating single-purpose hardware.

In another embodiment, a single-purpose hardware device for performing data frame encapsulation and/or decapsulation during encrypted WLAN communication is provided that comprises internal hardware components and an interface for communicating with an external hardware component configured to perform a connection set-up for the encrypted WLAN communication by executing software-implemented instructions. The internal hardware components comprise internal single-purpose hardware components for performing the data frame encapsulation and/or decapsulation once the connection set-up is completed.

In a further embodiment, an integrated circuit chip for performing data frame encapsulation and/or decapsulation during encrypted WLAN communication is provided that comprises internal integrated circuits and at least one data bus for communicating with an external CPU (Central Processing Unit) configured to perform a connection set-up for the encrypted WLAN communication by executing software-implemented instructions. The internal integrated circuits comprise internal single-purpose integrated circuits for performing the data frame encapsulation and/or decapsulation once the connection set-up is completed.

In yet another embodiment, a computer program product for performing encrypted WLAN communication is provided that comprises computer program means for performing a connection set-up for the encrypted WLAN communication and computer program means for communicating over an interface with a single-purpose hardware device capable of performing data frame encapsulation and/or decapsulation during the encrypted WLAN communication. The connection set-up is performed by executing software-implemented instructions.

In still another embodiment, a computer system for performing encrypted WLAN communication is provided that comprises first means for performing a connection set-up for the encrypted WLAN communication, and second means for performing data frame encapsulation and/or decapsulation during the encrypted WLAN communication. The first means is for performing the connection set-up by executing software-implemented instructions, and the second means comprises a single-purpose hardware device.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein:

FIG. 8 is a flow chart illustrating reception steps of encrypted WLAN communication according to an embodiment.

DETAILED DESCRIPTION OF THE INVENTION

The illustrative embodiments of the present invention will be described with reference to the Figure drawings.

Figure 1A:
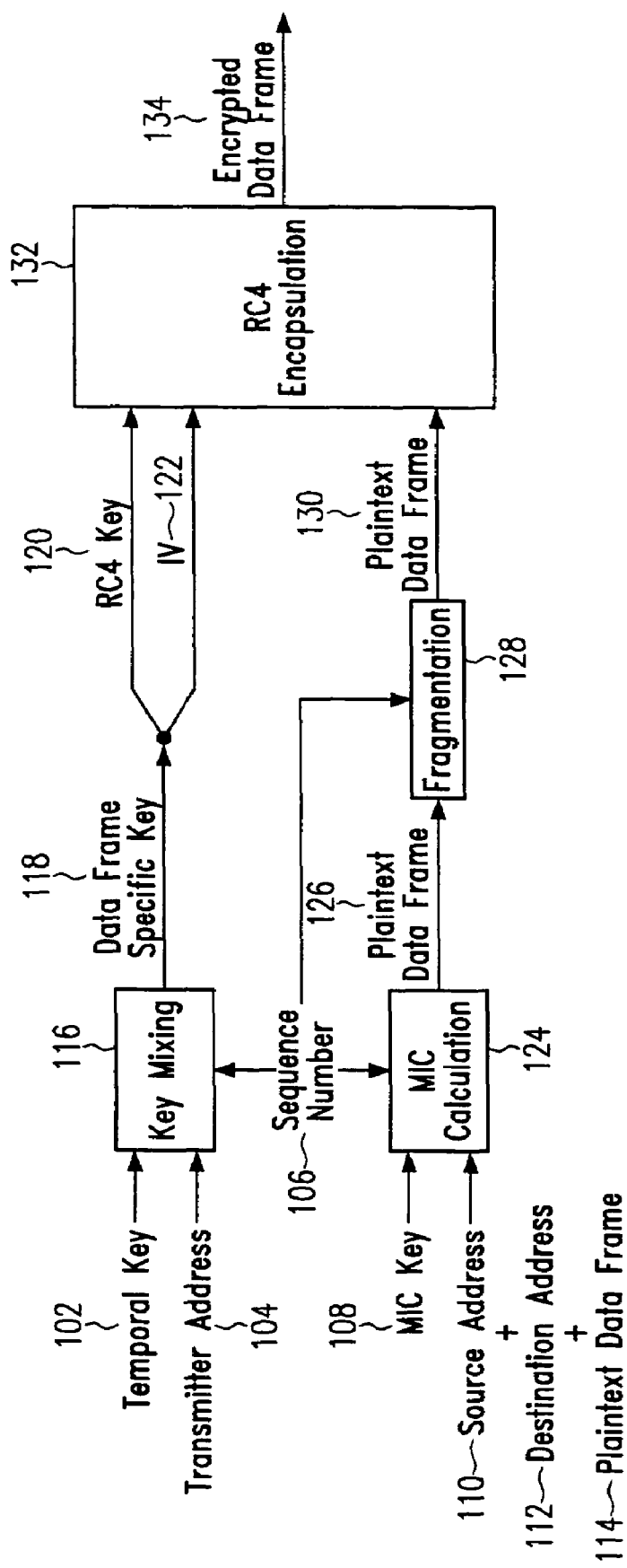
FIG. 1A illustrates data frame encapsulation according to the TKIP protocol.
Figure 1B:
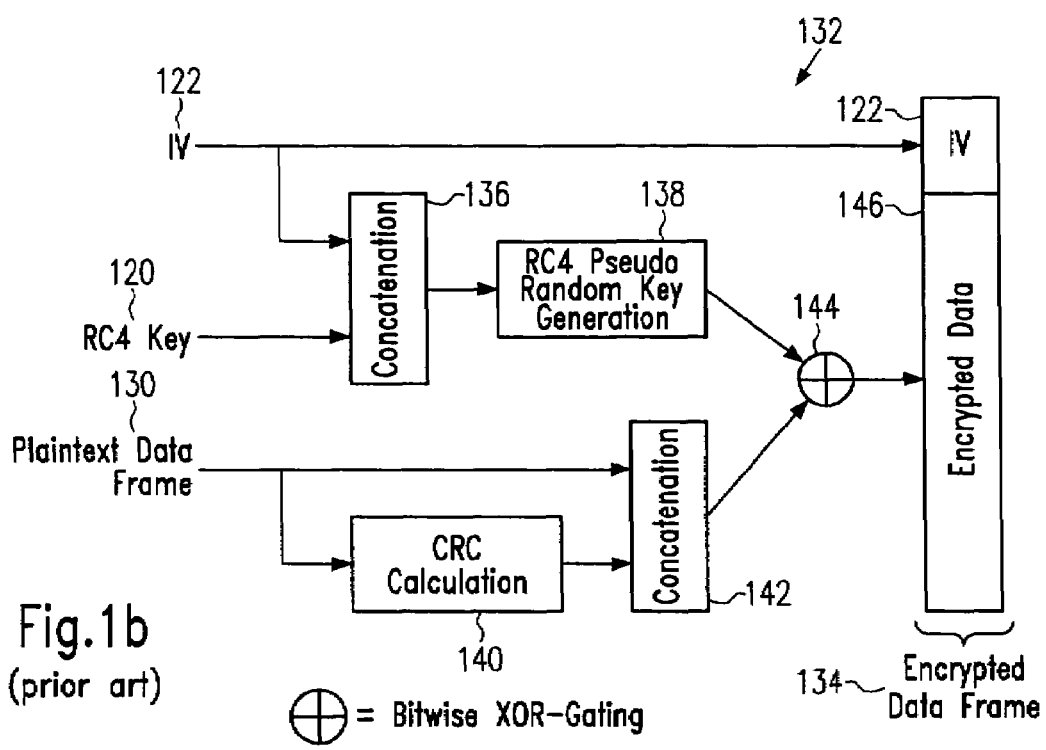
FIG. 1B illustrates RC4 encapsulation which is part of the TKIP data frame encapsulation of FIG. 1A.
Figure 2A:
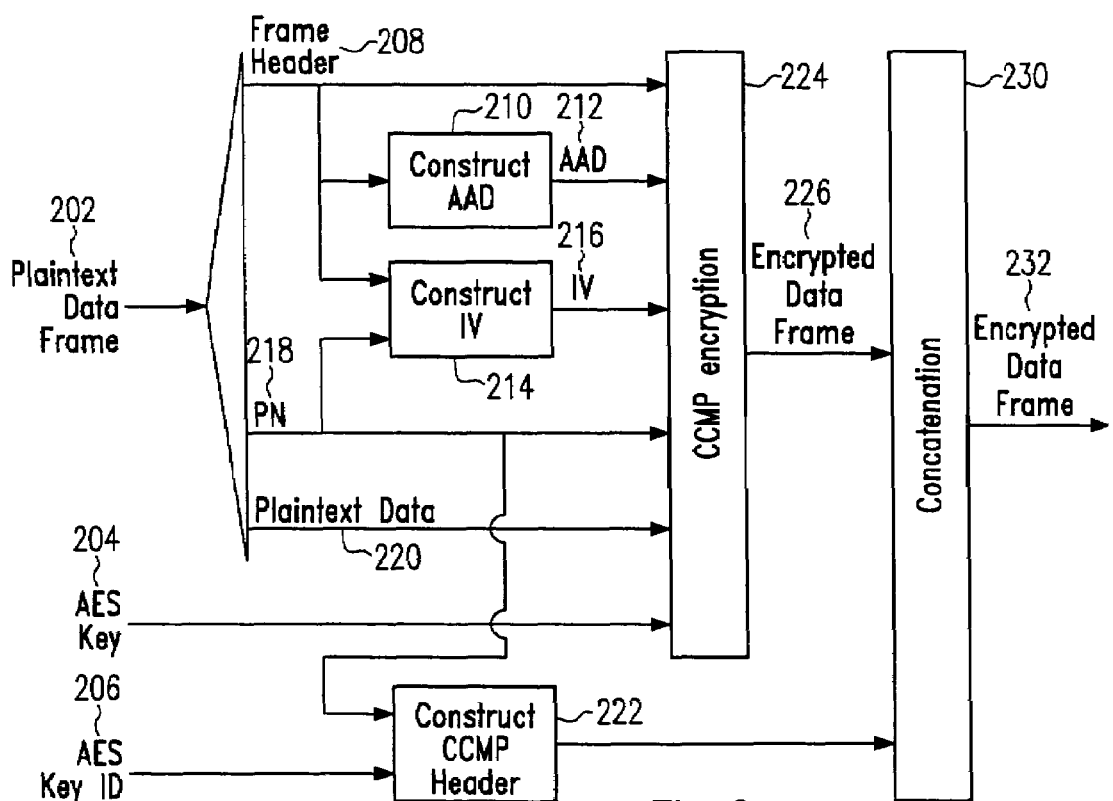
FIG. 2A illustrates data frame encapsulation according to the CCMP protocol.
Figure 2B:
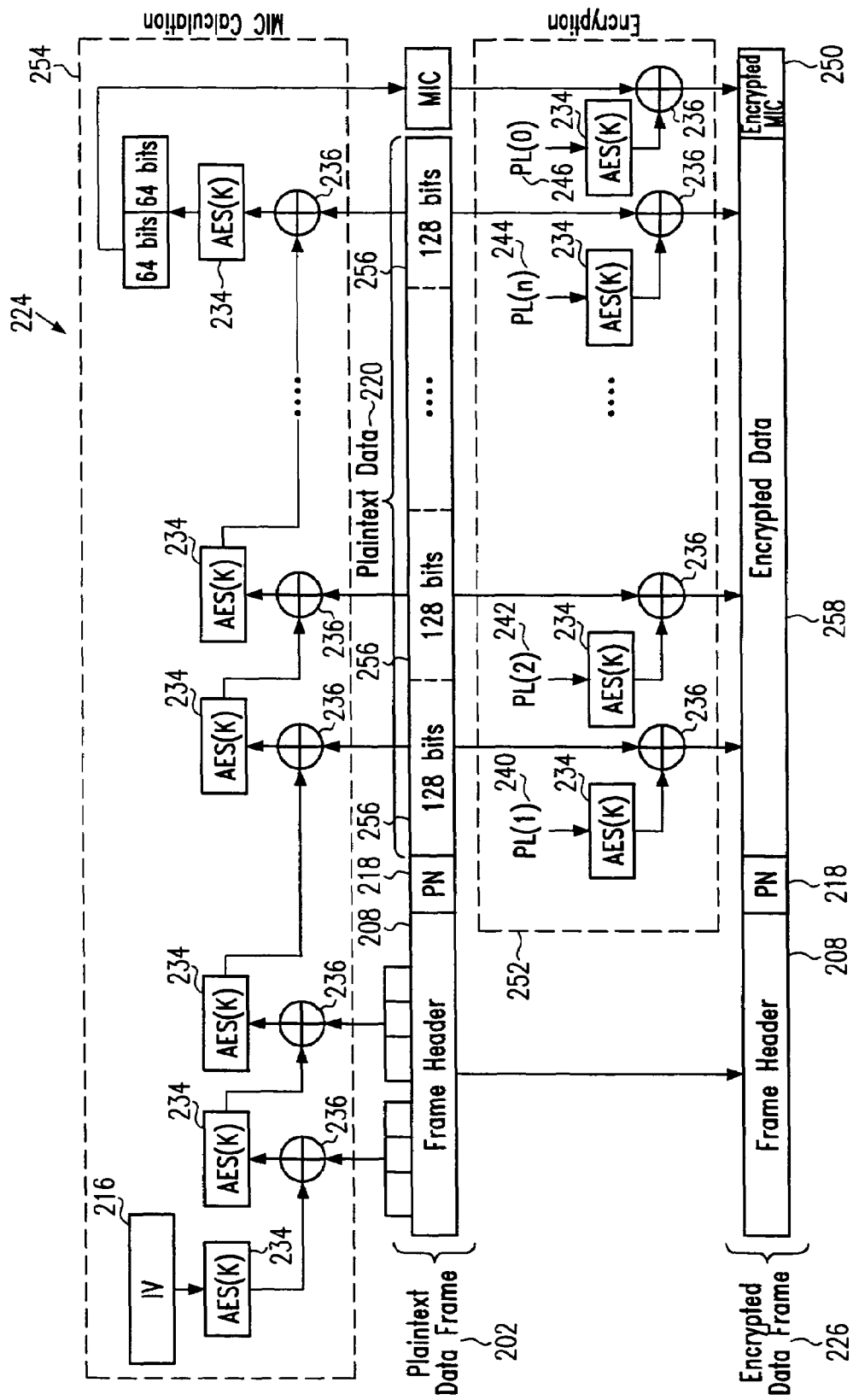
FIG. 2B illustrates CCMP encryption which is part of the CCMP data frame encapsulation of FIG. 2A.
Figure 2C:
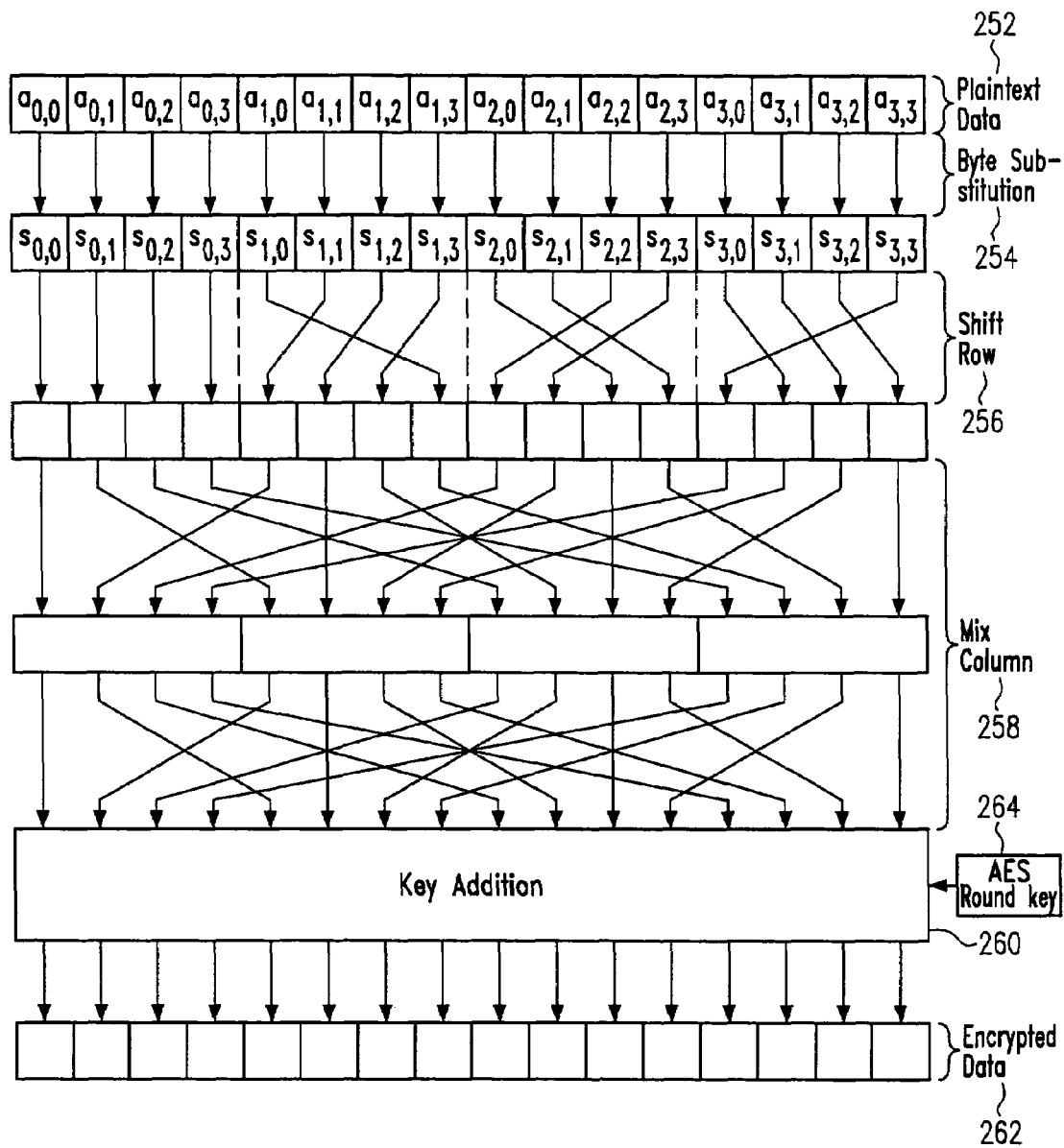
FIG. 2C illustrates a regular encryption round of AES encryption which is part of the CCMP encryption of FIG. 2B.
Figure 3:
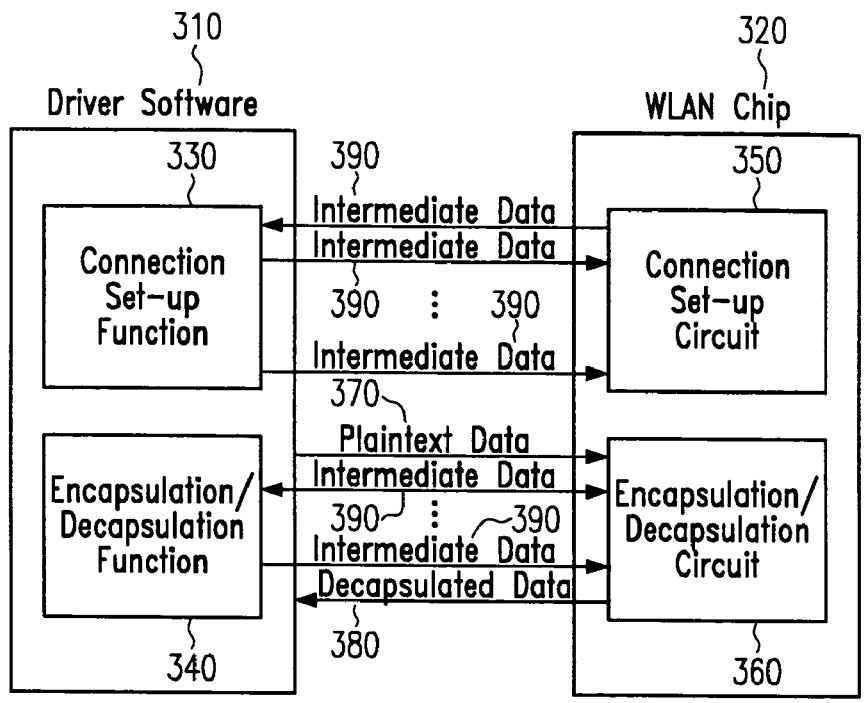
FIG. 3 is a block diagram illustrating the data exchange between driver software and a WLAN chip according to prior art.
Figure 4:
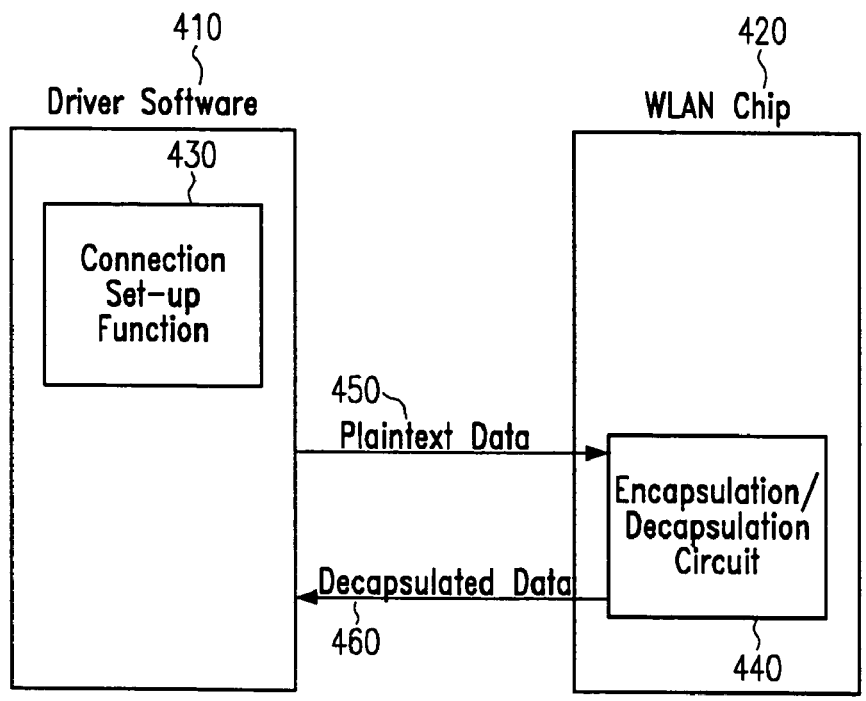
FIG. 4 is a block diagram illustrating the data exchange between driver software and a WLAN chip according to an embodiment.

Referring now to the drawings, and in particular to FIG. 4 which illustrates the data exchange between a driver software 410 running on a host CPU and a WLAN chip 420 according to an embodiment, the driver software 410 comprises a connection set-up function 430. However, in comparison to FIG. 3, which illustrates the data exchange between a driver software 310 and a WLAN chip 320 according to prior art, the WLAN chip 420 does not comprise the connection set-up circuit 350. All the steps of the connection set-up are performed by executing software-implemented instructions of the connection set-up function 430 of the driver software 410 without exchanging any intermediate data 390 with the WLAN chip 420.

The encapsulation/decapsulation circuit 440 is a single-purpose (or dedicated) hardware device, i.e. a purpose-built hardware device capable of performing the function it is designed for without executing any software-implemented instructions. In the present embodiment, the data exchange between the driver software 410 and the encapsulation/decapsulation circuit 440 is limited to the transmission of plaintext data 450 intended for data frame encapsulation from the driver software 410 to the encapsulation/decapsulation circuit 440 and the transmission of decapsulated data 460 in the opposite direction once the data frame decapsulation is completed. In comparison to the prior art depicted in FIG. 3, the data frame encapsulation/decapsulation is performed without executing any software-implemented instructions of a corresponding encapsulation/decapsulation function of the driver software 410. Further, no exchange of intermediate data 390 between the encapsulation/decapsulation circuit 440 and the driver software 410 occurs.

Figure 5:
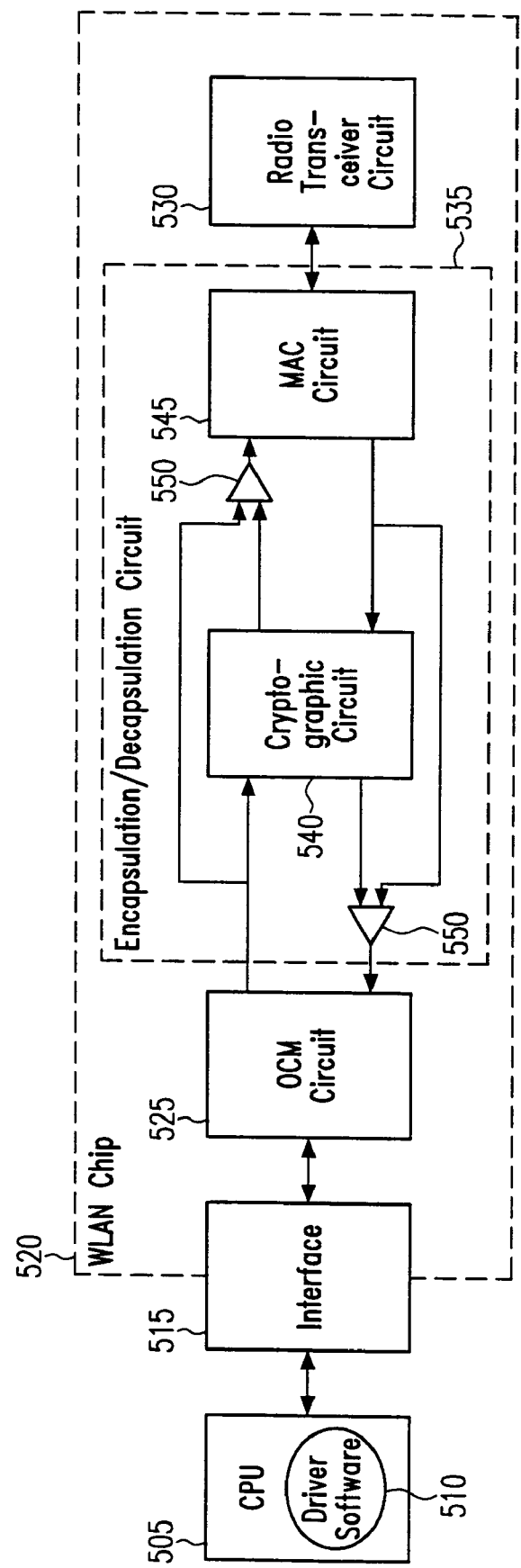
FIG. 5 is a block diagram illustrating the components of a WLAN compatible computer system according to an embodiment.

Turning now to FIG. 5, a WLAN compatible computer system and the data paths therein according to an embodiment are illustrated. The computer system may be adapted to perform encrypted WLAN communication based on the 802.11i security enhancement.

The WLAN chip 520 may comprise dedicated 802.11 hardware. In particular, it may comprise an OCM (On-Chip Memory) circuit 525, a radio transceiver circuit 530, and an encapsulation/decapsulation circuit 535 for realizing cryptographic algorithms. In the present embodiment, hardware mapped cryptographic functions are all data frame encapsulation and decapsulation tasks. The encapsulation/decapsulation circuit 535 may comprise a MAC hardware partition with 802.11i enhancement comprising a cryptographic circuit 540 and a MAC circuit (MAC hardware partition) 545, and may be operated periodically at 11 MHz for ciphering in a 802.11b WLAN. The cryptographic circuit 540 is connected to the OCM circuit 525 and the MAC circuit 545 so that it is capable of receiving data from the OCM circuit 525 and the MAC circuit 545 and sending data over the MUX-(Multiplex) gates 550 to the OCM circuit 525 and the MAC circuit 545. The MAC circuit 545 further is connected to the radio transceiver circuit 530 and the OCM circuit 525 so that it is capable of sending data to the OCM circuit 525 and receiving data therefrom over the MUX-gates 550, and sending data to and receiving data from the radio transceiver circuit 530.

The WLAN chip 520 may be installed on a host computer system comprising a CPU 505 for providing, in combination with a driver software (MAC software partition) 510 running on the CPU 505, WLAN compatibility to the computer system. The OCM circuit 525 of the present embodiment is connected with the CPU 505 over the interface 515 so that it is capable of communicating with the CPU 505.

The encapsulation/decapsulation circuit 535 is single-purpose hardware designed for performing data frame encapsulation and/or decapsulation, without executing any software-implemented instructions.

In the present embodiment, the 802.11i security enhancement may be partitioned on a MAC software partition of the driver software 510 and a MAC hardware partition within the encapsulation/decapsulation circuit 535.

In general, communication security for WLAN communications may be considered to comprise two major phases: a connection set-up phase for establishing a secure communication connection between a WLAN station and another WLAN station and/or a WLAN access point, and an actual encrypted WLAN communication phase. Once the connection set-up phase is completed, the encrypted WLAN communication can take place, during which encrypted data frames are exchanged between a WLAN station and another WLAN station and/or WLAN access point. The encrypted WLAN communication may be interrupted for a connection re-setup whenever appropriate, e.g., for a handover of the WLAN station from one WLAN access point to another.

Figure 6:
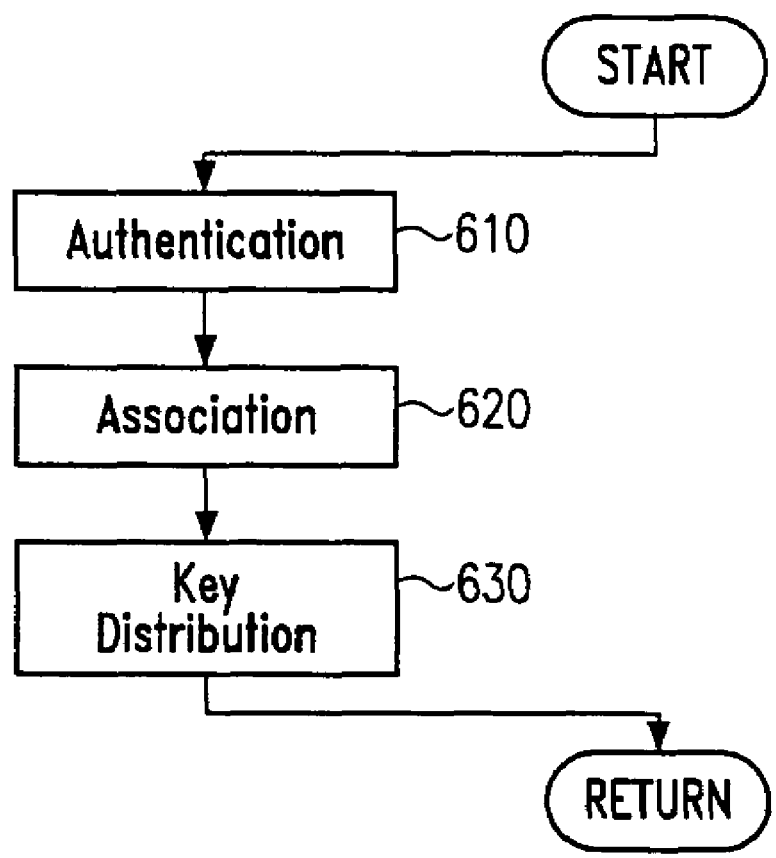
FIG. 6 is a flow chart illustrating a connection set-up for encrypted WLAN communication according to an embodiment.

FIG. 6 illustrates an execution of a connection set-up by a WLAN station according to an embodiment. The WLAN station may comprise the components depicted in FIG. 4 or FIG. 5. The connection set-up comprises authenticating the WLAN station as an authorized WLAN participant by another WLAN station and/or a WLAN authentication server in step 610. Once the authentication step 610 is completed, the WLAN station is associated with another WLAN station and/or a WLAN access point as communication counterparts in step 620. The associated communication counterparts may then exchange cryptographic keys in step 630 intended for later data frame encapsulation and/or decapsulation. In the present embodiment, all the authentication, association, and key distribution related functions are performed by executing software-implemented instructions of a connection set-up function 430 of a driver software 410, 510 without the involvement of any connection set-up hardware on the WLAN chip. They may be realized by the MAC software on the host CPU 505.

Figure 7:
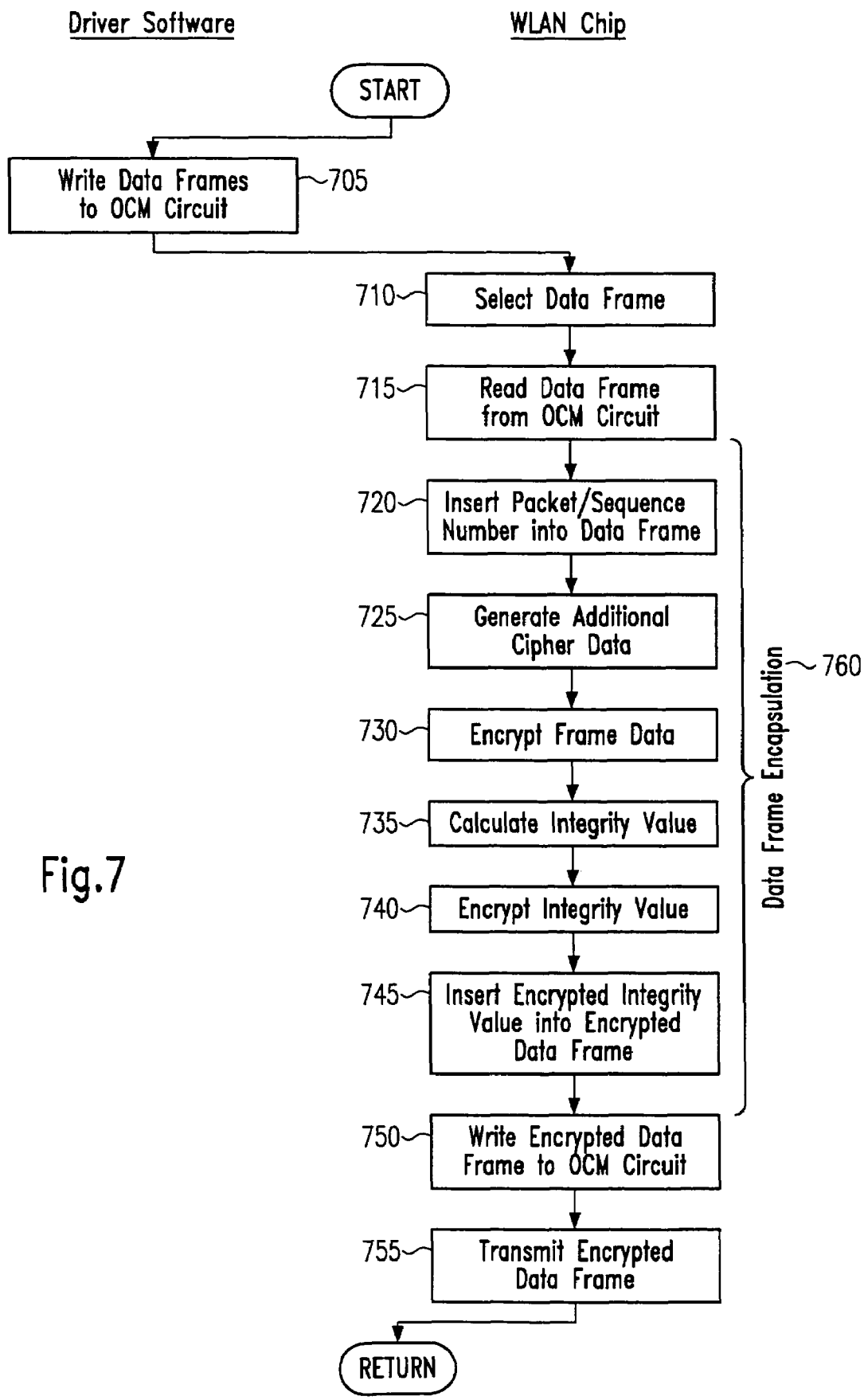
FIG. 7 is a flow chart illustrating transmission steps of encrypted WLAN communication according to an embodiment.

FIG. 7 illustrates a process of transmitting data frames, performed by a WLAN station during encrypted WLAN communication according to an embodiment. The WLAN station may comprise the components depicted in FIG. 4 or FIG. 5. A driver software 410, 510 writes data frames intended for data frame encapsulation to an OCM circuit 525 on a WLAN chip 420, 520 in step 705, and triggers the transmission process on the MAC hardware partition of the WLAN chip 420, 520. Each of the data frames may contain an additional header comprising cipher information, which indicates determining factors for performing the data frame encapsulation, e.g., the cipher protocol and cryptographic key to be applied and information on data frame fragmentation.

In step 710, a prioritization algorithm within the MAC hardware on the WLAN chip 420, 520 selects a data frame to be sent on air, and the selected data frame is read from the OCM circuit 525 in step 715. The following data frame encapsulation 760 comprises inserting a packet number and/or sequence number into the selected data frame in step 720. The packet number and/or sequence number may be inserted into the data frame at the very moment the data frame is selected by the prioritization algorithm. This may prevent out of order numbering of data frames which may occur in prior art encrypted WLAN communication due to the permutation of the frame order by the prioritization executed within the MAC hardware in comparison to the order in which the software wrote the frames into the OCM circuit 525.

Additional cipher data needed for encrypting the data frame may be generated by a cryptographic circuit 540 in step 725. The additional cipher data may comprise, e.g., a data frame specific key 118, an RC4 pseudo-random key 138, additional authentication data 212, an initialization vector 216, or a counter preload 240, 242, 244, or 246. This may allow an insertion of up-to-date packet numbers.

Further, the feature of establishing the additional cipher data by the WLAN chip 420, 520 may establish symmetry between the transmission and reception processes which often are asymmetric according to prior art: during the transmission process, the additional cipher data usually is prepared by the software and prepended to the data frames before sending them to the WLAN chip 320, whereas during the reception process, the additional cipher data has to be generated by the WLAN chip 320 prior to decryption.

Once the required additional cipher data is made available, at least part of the data frame, e.g., the frame body, is encrypted by the cryptographic circuit 540 in step 730. In step 735, an integrity value is calculated, which allows a later receiver of the encrypted data frame to verify whether the result of decapsulating the encrypted data frame is identical to the original data frame encapsulated by the transmitter. The integrity value may comprise a CCMP-based MIC when the data frame encapsulation 760 is performed according to the CCMP protocol, or a TKIP-based MIC and/or CRC-32 (32-bit CRC) when the data frame encapsulation 760 is performed according to the TKIP protocol. It is to be noted that other cipher protocols and integrity mechanisms may be used as well.

The integrity value calculation 735 of the present embodiment is performed by the single purpose encapsulation/decapsulation circuit 535. For reception of partitioned data frames, the calculation of a TKIP-based MIC (Michael MIC) may be mapped to software.

The calculated integrity value is encrypted by the cryptographic circuit 540 in step 740 and is then inserted into the encrypted data frame in step 745. The expression "encrypted data frame" denotes a data frame containing encrypted data and does not necessarily mean that all the data contained in the data frame are encrypted. Once the data frame encapsulation 760 is completed, the encrypted data frame is written to the OCM circuit 525 in step 750.

Finally, the encrypted data frame is transmitted by the radio transceiver circuit 530 in step 755. As apparent from FIG. 7, all the tasks with tight timing constraints, i.e. all the steps of the data frame encapsulation 760 are performed by the single-purpose encapsulation/decapsulation circuit 535 on the WLAN chip without interacting with the driver software 410, 510.

FIG. 8 illustrates a data frame reception process, performed by a WLAN station during encrypted WLAN communication, whereby the WLAN station again may comprise the components depicted in FIG. 4 or FIG. 5. A received encrypted data frame is read from the OCM circuit 525 in step 805. In step 810, the cipher information needed for decrypting the received data frame is read from the OCM circuit 525. The cipher information may correspond to the cipher information discussed with respect to FIG. 7 and may be contained in a hash memory within the OCM circuit 525. The hash memory may be established and maintained by the MAC software for cipher information retrieval at reception. It may contain cipher information for each receiver/transmitter pair. Its capacity can be adjusted dynamically and on-the-fly by the MAC software.

In step 815, additional cipher data is established, again corresponding to the additional cipher data and their generation discussed in relation to FIG. 7.

Once the cipher information and additional cipher data is available, the encrypted data contained in the encrypted data frame is decrypted by the cryptographic circuit 540 in step 820. The decryption step 820 may comprise the decryption of an encrypted integrity value included in the encrypted data frame. In step 825, the integrity value is calculated anew from the data contained in the data frame except the encrypted integrity value. The integrity value and its calculation 825 may correspond to those discussed with respect to FIG. 7.

In the present embodiment, the single-purpose encapsulation/decapsulation circuit 535 determines in step 830 whether there are differences between the decrypted integrity value resulting from step 820 and the integrity value calculated in step 825, and calculates a value indicating the determined differences. In step 835, the difference value is inserted into the decrypted data frame.

Once the data frame decapsulation 860, comprising the steps 810 to 835, is completed, the decrypted data frame is written to the OCM circuit 525 in step 840. Any time later, the decrypted data frame is sent from the OCM circuit 525 to the host CPU/memory in step 845. This may make the decryption independent from interrupt response latencies and prevent multiple data transfer between the host and a dedicated cipher accelerator hardware via busses. The determined differences between the recomputed and decrypted integrity value are sent to the MAC software on the CPU 505 by the cryptographic circuit 540.

The driver software 410, 510 determines whether there are differences between the decrypted integrity value and the calculated integrity value in step 850. If this is the case, the driver software 410, 510 may apply a required reaction, e.g., perform (Michael) counter-measures for limiting the amount of information available to a possible illegitimate WLAN protruder by performing software-implemented instructions in step 855, based on the received differences.

As apparent from FIG. 8, all the tasks with tight timing constraints, i.e. all the steps of the data frame decapsulation 860 may be performed by the single-purpose encapsulation/decapsulation circuit 535 on the WLAN chip 420, 520 without any interaction with the driver software 410, 510.

The data frame encapsulation and/or decapsulation may be performed using different cipher protocols. In one embodiment, the TKIP protocol may be applied. In this embodiment, the data frame encapsulation and/or decapsulation tasks may comprise RC4, CRC-32 and Michael MIC. The RC4 encryption may be implemented on part of the single-purpose encapsulation/decapsulation circuit 535, this part having an efficient, power aware tree architecture without the need for SRAM (Static Random Access Memory) usage. All data accesses necessary for encrypting or decrypting one byte of a data frame may be split over three operating periods of the single-purpose encapsulation/decapsulation circuit 535. Only the necessary tree segments are activated, e.g., charged and/or switched, which are the tree segments between the root and two leaves for encrypting or decrypting one byte of a data frame. The remaining wires and/or gates hold on low level.

In another embodiment, the data frame encapsulation and/or decapsulation may be accomplished according to the CCMP protocol. In that embodiment, the data frame encapsulation and/or decapsulation tasks may comprise CCMP-AES encryption and/or decryption and CCMP-AES based MIC computation. One round of the AES encryption 234 may be realized in four operating periods of the single-purpose encapsulation/decapsulation circuit 535. In the present embodiment, there may be twenty cryptographic substitution box mappings necessary which may be realized sequentially by a single-purpose CCMP-AES circuit included in the single-purpose encapsulation/decapsulation circuit 535. This may result in a lower gate count in comparison to the prior art. The single purpose CCMP-AES circuit can work with only five cryptographic substitution boxes.

As apparent from the above description of embodiments, the present invention may be applied for implementing the 802.11i security enhancement on hardware/software split MAC architecture. New functionality is provided. The functions necessary to realize the 802.11i security enhancement may be split into a subset realized within a driver software 410, 510 running on a host CPU 505 and a complementary subset realized by dedicated hardware. Only tasks with tight timing constraints may be mapped to the dedicated hardware, and the always available host CPU 505 may be used for all other tasks to save hardware. In an embodiment, all authentication related tasks of 802.11i may be mapped onto software. They may be performed only once at authentication.

All encapsulation and decapsulation tasks of data frames may be realized on dedicated hardware running at 11 MHz clock.

The presented hardware/software partitioned architecture for 802.11i security enhancement may be applied in combination with AMD's Am1772 WLAN product.

As discussed above, the hardware/software split may be selected such that an encapsulation and decapsulation with up-to-date packet and sequence numbers is possible. Received frames with lower packet numbers than already received frames may be discarded.

Further, the hardware/software partitioned cipher architecture may lead to an independence from latencies, i.e. interrupt response delays, on the interface 515 between the dedicated WLAN hardware 520 and the software driver residing on the system's host processor 505. At reception, the decryption and MIC computation may be started within the hardware partition without interaction with the software partition.

While the invention has been described with respect to the physical embodiments constructed in accordance therewith, it will be apparent to those skilled in the art that various modifications, variations and improvements of the present invention may be made in light of the above teachings and within the purview of the appended claims without departing from the spirit and intended scope of the invention. In addition, those areas in which it is believed that those of ordinary skill in the art are familiar have not been described herein in order to not unnecessarily obscure the invention described herein. Accordingly, it is to be understood that the invention is not to be limited by the specific illustrative embodiments, but only by the scope of the appended claims.

What is claimed is:

1. A method of performing encrypted WLAN (Wireless Local Area Network) communication, the method comprising:
   operating driver software to perform a connection set-up for said encrypted WLAN communication; and
   operating a WLAN chip to perform data frame encapsulation and decapsulation during said encrypted WLAN communication;
   wherein said connection set-up is performed by executing software-implemented instructions of said driver software without exchanging intermediate data with said WLAN chip, wherein performing said connection set-up comprises exchanging cryptographic keys between a WLAN station and another WLAN station and/or a WLAN access point;
   wherein said data frame encapsulation and decapsulation is performed on a single-purpose hardware of said WLAN chip without executing software-implemented instructions of said driver software, wherein performing said encrypted WLAN communication further comprises obtaining a plurality of data frames intended for said data frame encapsulation from driver software, wherein of performing said data frame encapsulation comprises calculating an integrity value appropriate for verifying integrity of one of the plurality of data frames once said data frame decapsulation is completed; and
   wherein performing said encrypted WLAN communication further comprises selecting one of the plurality of data frames for said data frame encapsulation by performing a prioritization algorithm implemented on the single-purpose hardware.

2. The method of claim 1, wherein the step of performing said connection set-up comprises authenticating a WLAN station by another WLAN station and/or a WLAN authentication server.

3. The method of claim 1, wherein the step of performing said connection set-up comprises associating a WLAN station with another WLAN station and/or a WLAN access point as WLAN communication counter-parts.

4. The method of claim 1, wherein the step of obtaining the plurality of data frames comprises obtaining a plurality of data frames comprising cipher information indicating a determining factor for performing the data frame encapsulation and/or decapsulation.

5. The method of claim 4, wherein said determining factor comprises a way in which a data frame intended for the data frame encapsulation is fragmented.

6. The method of claim 4, wherein said determining factor comprises a cipher protocol suitable for performing the data frame encapsulation.

7. The method of claim 4, wherein said determining factor comprises a cryptographic key suitable for encrypting a data frame.

8. The method of claim 1, wherein the step of performing said data frame encapsulation comprises inserting a package number and/or sequence number into one of the plurality of data frames.

9. The method of claim 1, wherein the step of performing said data frame encapsulation comprises encrypting at least part of one of the plurality of data frames.

10. The method of claim 1, wherein the step of performing said data frame encapsulation comprises encrypting said integrity value.

11. The method of claim 1, wherein the step of performing said data frame encapsulation comprises inserting the encrypted integrity value into one of the plurality of data frames.

12. The method of claim 1, wherein performing said encrypted WLAN communication further comprises receiving a data frame intended for said data frame decapsulation from a WLAN station and/or WLAN access point.

13. The method of claim 1, wherein the step of performing said data frame decapsulation comprises obtaining cipher information indicating a determining factor for performing the data frame encapsulation and decapsulation from a storage unit within the single-purpose hardware.

14. The method of claim 13, wherein said determining factor comprises a cipher protocol suitable for performing the data frame decapsulation.

15. The method of claim 13, wherein said determining factor comprises a cryptographic key suitable for decrypting a data frame.

16. The method of claim 12, wherein the step of performing said data frame decapsulation comprises decrypting at least part of the data frame.

17. The method of claim 16, wherein the data frame comprises an encrypted integrity value appropriate for verifying integrity of the data frame once said data frame decapsulation is completed, and the step of decrypting at least part of the data frame comprises decrypting the encrypted integrity value.

18. The method of claim 17, wherein the step of performing said data frame decapsulation further comprises calculating the integrity value from at least part of the data frame except the encrypted integrity value.

19. The method of claim 18, wherein the step of performing said data frame decapsulation further comprises calculating an integrity verification value indicating a difference between the decrypted integrity value and the calculated integrity value.

20. The method of claim 19, wherein the step of performing said data frame decapsulation further comprises inserting said integrity verification value into the data frame.

21. The method of claim 20, wherein performing said encrypted WLAN communication further comprises performing counter-measures according to said integrity verification value by executing software-implemented instructions, wherein said counter-measures are suitable for limiting the amount of information available to an illegitimate WLAN protruder.

22. The method of claim 1, wherein the step of performing said data frame encapsulation and decapsulation comprises generating cryptographic data suitable for encrypting or decrypting a data frame.

23. The method of claim 22, wherein the step of generating cryptographic data comprises generating authentication data suitable for encrypting a data frame in a manner specific to a WLAN station or decrypting a data frame encrypted in a manner specific to a WLAN station.

24. The method of claim 1, wherein said encrypted WLAN communication is performed based on the IEEE 802.11i security standard.

25. The method of claim 1, wherein said encrypted WLAN communication is performed in a WLAN based on the IEEE 802.11b standard.

26. The method of claim 1, wherein said software-implemented instructions are executed on general-purpose hardware by driver software.

27. The method of claim 1, wherein said single-purpose hardware is operated periodically.

28. The method of claim 27, wherein said single-purpose hardware is operated periodically at 11 MHz.

29. The method of claim 27, wherein said data frame encapsulation and decapsulation is performed according to the TKIP (Temporal Key Integrity Protocol) protocol.

30. The method of claim 29, wherein the step of performing said data frame encapsulation and decapsulation comprises performing RC4 (Rivest's Cipher 4) encryption and/or decryption.

31. The method of claim 30, wherein said RC4 encryption and/or decryption is performed by operating at least part of the single-purpose hardware.

32. The method of claim 31, wherein said part of the single-purpose hardware has a tree structure.

33. The method of claim 32, wherein said RC4 encryption and/or decryption is performed by operating only a sub-part of the single-purpose hardware corresponding to the tree root, part of the tree leaves and the tree components interconnecting the tree root with said part of the tree leaves.

34. The method of claim 33, wherein said sub-part of the single-purpose hardware corresponds to the tree root, two of the tree leaves and the tree components interconnecting the tree root with said two of the tree leaves.

35. The method of claim 30, wherein the step of performing said RC4 encryption and/or decryption comprises encrypting or decrypting at least part of a data frame comprising bytes, and said RC4 encryption and/or decryption is split over at least two operating periods of the single-purpose hardware to encrypt or decrypt one byte of the data frame.

36. The method of claim 27, wherein said data frame encapsulation and decapsulation is performed according to the CCMP (Counter-mode Cipher block chaining Message authentication code Protocol) protocol.

37. The method of claim 36, wherein the step of performing said data frame encapsulation and decapsulation comprises performing CCMP-AES (Advanced Encryption Standard) encryption and/or decryption.

38. The method of claim 37, wherein the step of performing said CCMP-AES encryption and/or decryption comprises encrypting or decrypting at least part of a data frame comprising bytes, and said CCMP-AES encryption and/or decryption is performed by repeatedly performing a sequence of encryption or decryption steps on said part of the data frame.

39. The method of claim 38, wherein the step of performing the sequence of encryption or decryption steps comprises performing byte substitution using a plurality of cryptographic substitution boxes.

40. The method of claim 39, wherein the step of performing byte substitution on said part of the data frame comprises sequentially performing the byte substitution on a plurality of sub-parts of said part of the data frame.

41. The method of claim 38, wherein the step of performing the sequence of encryption or decryption steps is split over at least two operating periods of the single-purpose hardware.

42. A single-purpose hardware device for performing data frame encapsulation and decapsulation during encrypted WLAN (Wireless Local Area Network) communication, comprising:
   internal hardware components; and
   an interface for communicating with an external hardware component configured to perform a connection set-up for the encrypted WLAN communication by executing software-implemented instructions of driver software without exchanging intermediate data with the single-purpose hardware device, wherein performing said connection set-up comprises exchanging cryptographic keys between a WLAN station and another WLAN station and/or a WLAN access point;
   wherein said internal hardware components comprise internal single-purpose hardware components configured to perform the data frame encapsulation and decapsulation without executing software-implemented instructions of said driver software once the connection set-up is completed, wherein performing said data frame encapsulation comprises calculating an integrity value appropriate for verifying integrity of one of the plurality of data frames once said data frame decapsulation is completed;
   wherein performing said encrypted WLAN communication comprises obtaining a plurality of data frames intended for said data frame encapsulation from driver software; and
   wherein said single-purpose hardware device is further configured to select one of the plurality of data frames for said data frame encapsulation by performing a prioritization algorithm implemented on the single-purpose hardware.

43. The single-purpose hardware device of claim 42, wherein said internal hardware components further comprise an internal memory for storing data frames intended for or resulting from the data frame encapsulation or decapsulation.

44. The single-purpose hardware device of claim 43, wherein said internal memory comprises an arbitration unit for performing memory access control.

45. The single-purpose hardware device of claim 43, wherein said internal memory comprises a hash memory for storing cipher information indicating a determining factor for performing the data frame encapsulation and decapsulation.

46. The single-purpose hardware device of claim 45, wherein said determining factor comprises a cipher protocol suitable for performing the data frame encapsulation and decapsulation.

47. The single-purpose hardware device of claim 45, wherein said determining factor comprises a cryptographic key suitable for encrypting or decrypting a data frame.

48. The single-purpose hardware device of claim 43, wherein said internal hardware components further comprise a radio transceiver configured to receive data frames from and transmit data frames to a WLAN station and/or WLAN access point.

49. The single-purpose hardware device claim 48, wherein said internal single-purpose hardware components comprise a cryptographic component for performing the data frame encapsulation and decapsulation and a MAC (Medium Access Control) component for communicating with the radio transceiver.

50. The single-purpose hardware device of claim 49, wherein said cryptographic component and said internal memory are arranged to communicate with each other.

51. The single-purpose hardware device of claim 49, wherein said cryptographic component and said MAC component are arranged to communicate with each other.

52. The single-purpose hardware device of claim 49, wherein said MAC component and said internal memory are arranged to communicate with each other.

53. The single-purpose hardware device of claim 49, wherein said internal memory is arranged to communicate, over the interface, with the external hardware component.

54. The single-purpose hardware device of claim 42, wherein at least one of said internal single-purpose hardware components is capable of inserting a packet number and/or sequence number into a data frame.

55. The single-purpose hardware device of claim 42, wherein at least one of said internal single-purpose hardware components is capable of generating cryptographic data suitable for encrypting or decrypting a data frame.

56. The single-purpose hardware device of claim 55, wherein said at least one of the internal single-purpose hardware components is capable of generating cryptographic data comprising authentication data suitable for encrypting a data frame in a manner specific to a WLAN station or decrypting a data frame encrypted in a manner specific to a WLAN station.

57. The single-purpose hardware device of claim 42, wherein said internal single-purpose hardware components are for performing the data frame encapsulation and decapsulation according to the TKIP (Temporal Key Integrity Protocol) protocol;
   wherein at least part of the internal single-purpose hardware components further is for performing RC4 (Rivest's Cipher 4) encryption and/or decryption; and
   wherein said part of the internal single-purpose hardware components is adapted to perform the RC4 encryption and/or decryption on at least part of a data frame comprising bytes.

58. The single-purpose hardware device of claim 57, wherein said part of the internal single-purpose hardware components has a tree structure; and
   wherein said part of the internal single-purpose hardware components is further adapted to perform the RC4 encryption and/or decryption on one byte by operating only a sub-part of said part of the internal single-purpose hardware components, said sub-part corresponding to the tree root, part of the tree leaves and the tree components interconnecting the tree root with said part of the tree leaves.

59. The single-purpose hardware device of claim 58, wherein said sub-part of said part of the internal single-purpose hardware components corresponds to the tree root, two of the tree leaves and the tree components interconnecting the tree root with said two of the tree leaves.

60. The single-purpose hardware device of claim 57, wherein said single-purpose hardware device is operated periodically; and
   wherein said part of the internal single-purpose hardware components is adapted to perform the RC4 encryption and/or decryption on one byte by splitting the RC4 encryption and/or decryption over at least two operating periods of said single-purpose hardware device.

61. The single-purpose hardware device of claim 42, wherein said internal single-purpose hardware components are for performing the data frame encapsulation and decapsulation according to the CCMP (Counter-mode Cipher block chaining Message authentication code Protocol) protocol;

wherein at least part of the internal single-purpose hardware components further is for performing CCMP-AES (Advanced Encryption Standard) encryption and/or decryption on at least part of a data frame comprising bytes by repeatedly performing on said part of the data frame a sequence of encryption and/or decryption steps comprising byte substitution; and wherein said part of the internal single-purpose hardware components comprises a plurality of cryptographic substitution boxes for performing the byte substitution.

62. The single-purpose hardware device of claim 61, wherein said plurality of cryptographic substitution boxes is adapted to perform the byte substitution on said part of the data frame by sequentially performing the byte substitution on sub-parts of said part of the data frame.

63. The single-purpose hardware device of claim 61, wherein said single-purpose hardware device is operated periodically; and wherein said internal single-purpose hardware components are adapted to perform the sequence of encryption and/or decryption steps by splitting said sequence over at least two operating periods of the single-purpose hardware device.

64. An integrated circuit chip for performing data frame encapsulation and decapsulation during encrypted WLAN (Wireless Local Area Network) communication, comprising:

internal integrated circuits; and at least one data bus for communicating with an external CPU (Central Processing Unit) configured to perform a connection set-up for the encrypted WLAN communication by executing software-implemented instructions, wherein said connection setup is performed by driver software without exchanging intermediate data the integrated circuit chip, wherein performing said connection set-up comprises exchanging cryptographic keys between a WLAN station and another WLAN station and/or a WLAN access point;

wherein said internal integrated circuits comprise internal single-purpose integrated circuits configured to perform the data frame encapsulation and decapsulation without executing software-implemented instructions of said driver software once the connection set-up is completed, wherein performing said data frame encapsulation comprises calculating an integrity value appropriate for verifying integrity of one of the plurality of data frames once said data frame decapsulation is completed;

wherein performing said encrypted WLAN communication comprises obtaining a plurality of data frames intended for said data frame encapsulation from driver software, and further comprises selecting one of the plurality of data frames for said data frame encapsulation by performing a prioritization algorithm implemented on the single-purpose integrated circuit.

65. A computer system for performing encrypted WLAN (Wireless Local Area Network) communication, comprising:

first means for performing a connection set-up for said encrypted WLAN communication, wherein performing said connection set-up comprises exchanging cryptographic keys between a WLAN station and another WLAN station and/or a WLAN access point; and second means for performing data frame encapsulation and decapsulation during said encrypted WLAN communication, wherein said data frame encapsulation performed by said second means includes calculating an integrity value appropriate for verifying integrity of one of the plurality of data frames once said data frame decapsulation is completed;

wherein said first means is for performing the connection set-up by executing software-implemented instructions of driver software without exchanging data with said second means; and wherein said second means comprises a single-purpose hardware device, and wherein said second means is configured to perform without executing software-implemented instructions of said driver software;

wherein performing said encrypted WLAN communication comprises obtaining a plurality of data frames intended for said data frame encapsulation from driver software, and selecting one of the plurality of data frames for said data frame encapsulation by performing a prioritization algorithm implemented in said second mean.

66. The method as recited in claim 1, wherein the single-purpose hardware is a circuit dedicated for performing encapsulation and decapsulation without execution of any software instructions.

67. The method as recited in claim 66, wherein the single-purpose hardware is coupled to receive plaintext data from the driver software, and wherein the single-purpose hardware is further coupled to provide decapsulated data to the driver software.

68. The single-purpose hardware device as recited in claim 49, wherein the single-purpose hardware device further includes a first multiplexer configured to select a communication path to the MAC component from either the internal memory or the cryptographic component, and further includes a second multiplexer configured to select a communication path to the internal memory from either the MAC component or the cryptographic component.

* * * * *

UNITED STATES PATENT AND TRADEMARK OFFICE
CERTIFICATE OF CORRECTION

PATENT NO. : 7,627,747 B2 Page 1 of 1
APPLICATION NO. : 10/816687
DATED : December 1, 2009
INVENTOR(S) : Eckhardt et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 883 days.

Signed and Sealed this

Second Day of November, 2010

David J. Kappos
*Director of the United States Patent and Trademark Office*